United States Patent [19]

Lage et al.

[11] 3,900,828
[45] Aug. 19, 1975

[54] ON-BOARD TIRE STRUT FAULT APPARATUS FOR AIRCRAFT AND THE LIKE

[75] Inventors: David A. Lage, Woburn; Donald A. Senour, Carlisle, both of Mass.

[73] Assignee: BLH Electronics, Inc., Waltham, Mass.

[22] Filed: July 26, 1974

[21] Appl. No.: 492,209

[52] U.S. Cl. .................. 340/27 R; 73/65; 73/146; 340/58
[51] Int. Cl.² ............................................ G08G 1/12
[58] Field of Search ........ 340/27 R, 58; 73/146, 65; 180/100; 280/1.12, 112 A, DIG. 1; 244/100 R, 102 A, 104 R, 111; 116/34; 235/61.11 J, 150.2, 150.22

[56] References Cited
UNITED STATES PATENTS

| | | | |
|---|---|---|---|
| 3,128,970 | 4/1964 | Tinajero et al. | 244/100 |
| 3,310,976 | 3/1967 | Bussel et al. | 73/65 |
| 3,584,503 | 6/1971 | Senour | 73/65 |
| 3,587,296 | 6/1971 | Povdas | 73/65 |
| 3,722,270 | 3/1973 | Sperberg | 73/146 |

*Primary Examiner*—Thomas B. Habecker
*Assistant Examiner*—James Groody
*Attorney, Agent, or Firm*—James E. Mrose

[57] ABSTRACT

In an aircraft or other multi-wheeled vehicle equipped with strain-gage transducers for sensing the loading conditions extant at sites of ground support, defective or potentially hazardous degradations and faults of tire and/or strut suspensions are signalled automatically by way of electrical comparisons of the outputs from diagonally disposed transducer installations; the transducer provisions of on-board aircraft weight and center-of-gravity systems afford a convenient means for obtaining the outputs needed to excite computing and indicating equipment which insure that any such malfunctions, once detected, are locked into displays commanding corrective attention.

11 Claims, 9 Drawing Figures

PATENTED AUG 19 1975　　　　　　　　　　3,900,828

ON-BOARD TIRE STRUT FAULT APPARATUS FOR AIRCRAFT AND THE LIKE

BACKGROUND OF THE INVENTION

The present invention relates to improvements in so-called "on-board" electrical apparatus which responds to loading conditions of aircraft and like vehicles and automatically detects and signals the existence of faulty suspensions by tires and/or struts, and, in one particular aspect, to novel and improved electrical equipment which may be carried aboard certain multi-wheeled aircraft to characterize and provide warnings of "blown tire" and/or depressurized-strut conditions, and in which the outputs from axle-borne weight transducers of on-board aircraft weight-and-c.g. installations are uniquely and automatically compared for such purposed.

Modern high-capacity aircraft are commonly equipped with undercarriage or landing-gear structures which involve a multiplicity of inflated tires arrayed in sets or "bogies" associated with different ones of several retractably main struts. These undercarriages must be capable of withstanding enormous loadings and shocks, and very high landing and take-off speeds, without significant hazard to craft occupants and cargo. Although such capabilities can be realized physically, as the result of extraordinary technical advances in the field, such undercarriages may nevertheless fail to perform as intended if any one of the tires happens to be flat or even underinflated, or if the hydraulic pressurizing of a strut is not maintained at a predetermined level. The serious nature of such problems can be readily appreciated when it is realized that one flat or inadequately inflated tire of a multiple set may not be easily discerned on casual visual inspection and yet can be grossly damaged, can cause other tires of the set to be overloaded and damaged, and can be overheated to the point of flammability as the consequence of high-speed runway travel of the craft. Hazards associated with defective pressurizing of a strut of such an aircraft can likewise be very serious, inasmuch as the craft then becomes more vulnerable to structural damage while landing or, especially, during taxiing, and the remaining struts can then be exposed to injurious overloads. In addition, improper re-distribution of strut loadings can lead to erroneous automatic center-of-gravity measurements, which are based upon substantially normal distributions of such loadings; timely detection of strut faults would therefore prevent unwarranted reliance upon c.g. measurements which might be critical to safe operation of the craft.

Separate tire-pressure readings cannot be taken easily and economically from outside by a ground maintenance crew each time a many-wheeled aircraft prepares for take-off, and equipment which routinely comes to mind for automatic sensing of rotatable-wheel tire pressures could be expected to involve elaborate and undesirably weighty provisions for telemetering. In accordance with the present teachings, however, neither tire nor strut pressure need be sensed directly, and, instead, the related fault conditions are detected via unique electrical comparisons of outputs from strain gages which respond to loading-induced elastic deformations of relatively stationary wheel-support structure of the undercarriage. Strain-gage transducers, such as those known for on-board measurements and calculations of weight and c.g., may advantageously be caused to serve the purposes of detecting and warning of these tire and/or strut failures, in addition to their other functions. Shear-responsive strain-gage transducers, designed to be colleted within hollow axles, and suitable for implementation of this invention also, are disclosed in U. S. Pat. Nos. 3,426,586 and 3,620,074 and 3,625,053; external-axle boss-mounted transducers are also known and may be similarly employed. System operations involving such transducers, for aircraft weight and c.g. measurements, are discussed in U. S. Pat. No. 3,727,180.

SUMMARY

The craft with which this invention finds principal use are those having undercarriages wherein four distributed sites of support are in relatively rigid interconnection, as is the case with an aircraft having bogies with the usual four wheels per strut, and/or having four "main" struts. Considering the example of one such four-wheeled bogie, with two sets of two wheels each spaced fore and aft of a common strut, and with strain-gage transducers characterizing the loadings witnessed in the axle support for each of the wheels, the recognitions which underlie the present teachings are to the effect that a flat or soft tire will be reliably detected when outputs from diagonally disposed pairs of the transducers are compared. Under conditions when all of the tires are properly inflated, the compared outputs should fall within a very small percentage of one another, whereas a flat or seriously deflated tire will cause the associated transducer output to fall far below the outputs from the remaining three transducers associated with the other tires to which all or most of the load-carrying function has been shifted; the aforementioned diagonal-pair electrical comparison then exhibits a large percentage difference and thereby signifies a tire fault. Alternative comparisons, involving isolated evaluations of the outputs from the individual transducers, would of course require cumbersome and weighty cabling, which is undersirable in aircraft installations, and, in addition, the "normal" outputs for varying conditions of craft loading would have to be established as references for meaningful comparisons to be made. The aforementioned diagonal-pair comparisons inherently obviate the need for other reference signals which would be changed as craft loadings change. Comparisons between outputs of the transducers associated with the fore and aft axles, or between the outputs of transducers associated with the two inboard and outboard wheels, of a bogie, tend to be unreliable for the purposes under discussion because of the untoward influences of pivot-pin frictions and of unequal loadings resulting from flexing of the craft, particularly flexure of wings to which such a bogie may be connected. Even comparisons of the transducer outputs associated with individual wheels located in lateral complementary or symmetrical positions, in complementing pairs of bogies, presents accuracy problems, inasmuch as the craft may quite commonly be laterally unbalanced due to unsymmetrical loading, runway slope, and ambient wind conditions. Diagonal-pair comparisons, on the other hand, are not seriously degraded by the aforementioned influences.

In similar fashion, a comparison between summed transducer outputs from the two pairs of diagonally opposite bogies in a four-bogie array characterizes any strut fault, such as inadequate hydraulic pressure.

Comparator circuitry which responds to the transducer outputs takes into account an acceptable range of variations which do not signify actual faults, preferably by way of reference signals which are derived from complementary channels and are therefore substantially independent of variable craft loadings. Further, the detection of any fault is immediately latched into a sustained warning indication, to avoid possible loss of warning in the event that more than one tire becomes defective, as is the tendency when one has become flat and the others witness consequential overloading. Automatic reset of the system is achieved upon craft lift-off, as the result of related reductions in transducer outputs.

Accordingly, it is one of the objects of this invention to provide novel and improved apparatus of relatively uncomplicated and lightweight construction which reliably detects and signals occurrences of vehicle-undercarriage malfunctions, and, in particular, occurrences of flat or underinflated tires and/or strut faults in the landing gear of multi-wheeled aircraft.

Another object is to provide a unique on-board aircraft electrical warning system which responds to sensed elastic deformations of wheel-support structures and automatically compares outputs from pairs of strain-gage installations at diagonally disposed sites of support, among groups of four such sites, to characterize faulty conditions of support by tires, struts and the like.

Still further, it is an object to provide automatic self-resetting electrical "blown tire" indicating equipment lending itself to advantageous use with on-board aircraft weight transducers and involving unique electronic comparisons by way of outputs delivered by a minimum number of cabling connections, the comparisons being referenced to tolerance signals which are substantially independent of craft loading variations, and the warning indications being automatically sustained to avoid confusion induced by multiple successive faults.

BRIEF DESCRIPTION OF THE DRAWINGS

Although the aspects and features of this invention which are considered to be novel are expressed in the appended claims, further details as to preferred practices and as to the further objects and features thereof may be most readily comprehended through reference to the following description of the preferred embodiments taken in connection with the accompanying drawings, wherein:

DESCRIPTION OF THE PREFERRED EMBODIMENTS

Figure 1:
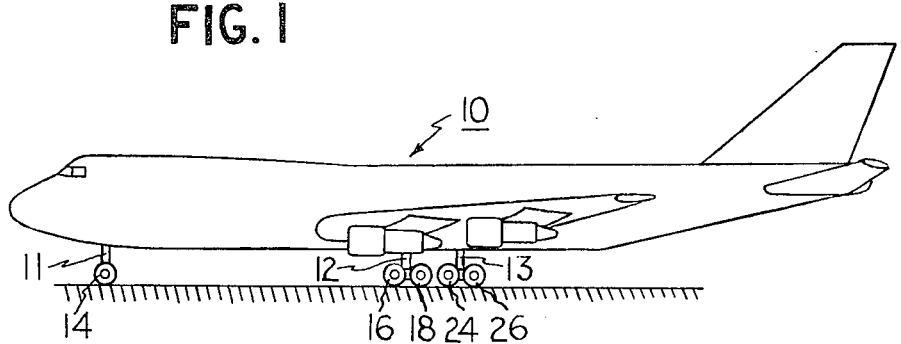
FIG. 1 is a side view of an alighted aircraft having an undercarriage array of wheels and bogies which lends itself to practice of the invention.

The alighted aircraft 10 depicted in FIG. 1 is of a modern jumbo class with which the present invention can be exploited to particular advantage, inasmuch as there are numerous clusters of wheels and several struts which may develop undetected faults of extremely hazardous character. In addition to the usual pair of nose wheels associated with a nose strut 11, such a craft may include wing- and body-supported struts, such as 12 and 13, each of which is pivoted at its lower end with a bogie cluster of four pneumatically tired wheels. The array of tires and struts appearing in FIG. 2 corresponds generally with that used on craft 10, with the exception that in actual practice the wing struts and bogies are actually spread further apart laterally than the rear body struts and bogies of the main undercarriage. A total of eighteen wheels is associated with the five struts for such a craft, and the maintenance of critical predetermined tire pressures represents a costly practice when it must be performed by ground crews each time a craft in efficient substantially continuous use is readied for taxiing and takeoff. Even the existence of a completely "flat" (i.e. zeropressure) tire may not be readily discernible by eye, because other tires of the main undercarriage tend to sustain the associated bogie in approximately the intended position. However, the rigors of aircraft taxiing, landing and take-off are so severe that a tire which is not "flat" but only partly deflated (such as at about half normal pressure) may be seriously damaged and dangerously overheated. Such underinflation is here included in references to "blown" tires, such that it will be understood either flat or dangerously-underinflated tires are meant.

In addition to the problems alluded to above in respect of "blown" tires, there is sometimes the further difficulty that a craft such as is illustrated in FIG. 1 may have main struts which are independently hydraulically pressurized, and that inadequate hydraulic pressure in any one of the four main struts (12, 12a, 13, 13a, in FIG. 2) can lead to damage of the craft, particularly during the worst loading conditions experienced during taxiing, and can also lead to overloading and possible damage of the remaining struts, and can further lead to serious error in critical center-of-gravity measurements which may be performed by a known type of on-board weight and c.g. system. The latter difficulty arises because craft weight is distributed improperly among remaining struts when one of them is depressurized and fails to sustain its share of the loading. The well-known standards for aircraft c.g. calculations, which need not be considered in detail here, make it plain that the c.g. computation can be very much in error if the strut loadings on each side of the craft are not symmetrically distributed. It should therefore be evident that automatic means for detecting and signaling such faults in tires and struts is highly desirable. Aircraft problems are of principal concern in these discussions, although comparable needs may occur in connection with other vehicles having multiple tires and unusual suspensions, such as trucks and construction equipment.

Referring once again to the FIG. 2 diagram of undercarriage structure for a vehicle such as aircraft 10, it is noted that the nose strut 11 is associated with a pair of tires 14 and 15, and that the laterally extending cantilevered axles for the wheels on which these tires are mounted have transducer provisions as designated by X symbols at 14a and 14a. Preferably such transducer provisions are each in the form of a known type of shear-responsive transducer colleted within the hollow interior of the axle which it serves; such transducers are used in on-board aircraft weight and c.g. systems, and can very advantageously be caused to function for these tire-strut indication purposes also. Transducers of that type are described in U.S. Pat. Nos. 3,426,586 and 3,620,074 and 3,625,053, for example. Other provisions may be resorted to instead, such as boss-mounted external transducers, or simple strain gages applied to the axles at appropriate positions where they will respond to and characterize the magnitude of loadings transmitted through the axles at any time. Similarly, the wingmounted struts 12 and 12a are each associated with four wheels, 16 through 23, whose supports by bogie axles involve load-responsive transducers 16a through 23a. And, in the case of the body-mounted struts 13 and 13a each is correspondingly associated with four wheels, 24 through 31, whose supports by bogie axles involve load-responsive transducers 24a through 31a. For weight-and-c.g. measurement purposes, the electrical cables 32 through 35 each needs only to include two conductors, typically, to carry to remote instrumentation the parallelled four-arm bridge output information from four of the transducers. However, the requirements of preferred tire/strut indications in accordance with these teachings are that there be separate parallel connections of diagonally opposite pairs of transducers in each bogie and that these be brought separately to the tire/strut comparator and indicator equipment 36; accordingly, each of cables 32–35 should be understood to be of a double type, which, in the case of full strain-gage bridge connections in the transducers, would typically involve four bridge-output conductors. Nose-wheel cabling 37 may likewise involve two separate circuits, to enable a comparison between outputs from its transducers 14a and 15a, although "blown" tire or strut-failure indications are not always essential, inasmuch as difficulties at that site readily exhibit themselves in terms of hard steering and bumpy riding characteristics. The preferred embodiment under discussion here is therefore concerned only with such problems in the main undercarriage of an aircraft.

Figure 3:
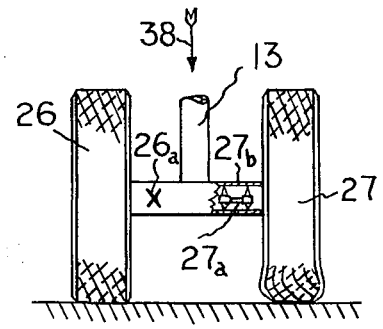
FIG. 3 is an end view of a bogie arrangement, such as one of the several appearing in FIG. 2, with one form of transducer illustrated in position within an axle associated with a "blown" tire.
Figure 4:
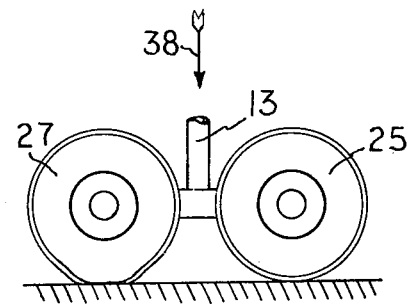
FIG. 4 provides a side view of the bogie of FIG. 3.

FIGS. 3 and 4 illustrate the bogie arrangement associated with body strut 13, with a "blown" tire condition being postulated for the inboard rear tire 27. The transducer 27a (FIG. 3) associated with the hollow cantilevered axle 27b for the wheel carrying tire 27 therefore carries less of the load applied in the direction of arrow 38 than do the remaining tires for that bogie. In particular, tires 25 and 26 tend to carry the bulk of such loading, because a bogie construction like that under consideration causes the tire 24 diagonally opposite to the "blown" tire 27 to be isolated from much of the loading also. Accordingly, transducer 24a associated with wheel 24 exhibits a markedly lessened output as well, and, if the lowered combined outputs of transducers 27a and 24a are compared with the collaterally increased combined outputs of transducers 25a and 26a, the significant difference will clearly signal that a tire fault is present. Visual inspection of the tires may not readily disclose such a fault, particularly if it involves only underinflation rather than a wholly "flat" tire, because others of the multiple tires will preserve a substantially normal appearance of the undercarriage, and because some tire deformations occur naturally with runway irregularities, uneven craft loading, and the like.

The related needed comparisons of electrical signals, and displays of tire/strut faults, are provided by equipment 36 which is remote from the transducers themselves. A suitable cockpit display may take the form shown in FIG. 5, wherein a panel-mounted unit 39 contains warning lights for automatic illumination of markings characterizing a "blown" tire among the wing bogies, at 39a, among the body bogies, at 39b, among the wing struts, at 39c, and among the body struts, at 39d. Once a fault warning has been signalled, it is important that it be sustained or "latched" until it has been noticed for corrective action. This is particularly true of tire faults, because one tire failure tends to be followed quickly by another as the result of attendant overloading, and the effects of two "blown" tires in one bogie may offset one another and thereby extinguish the critically necessary warning. Circuitry described later herein includes such latching provisions, and, in addition, the display unit may incorporate a reset switch 39e and test switching 39f by which the operator may reset the system following remedial action and may test its proper operation.

Figure 2:
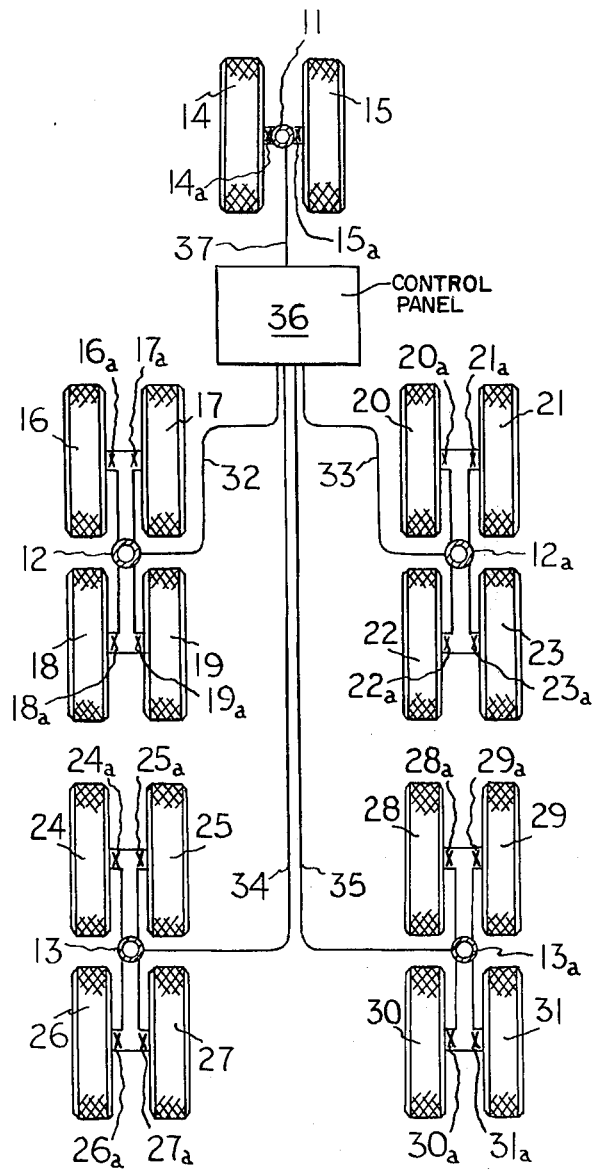
FIG. 2 comprises a partly pictorial and partly schematic diagram of the improved system for tire/strut fault indications, involving a suitable distribution of wheels, bogies and transducers.
Figure 6:
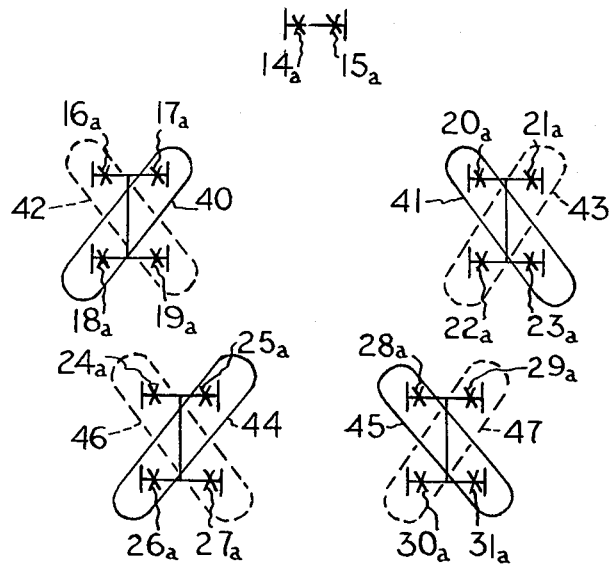
FIG. 6 represents a schematic diagram of an undercarriage arrangement like that of FIG. 2, together with dashed- and solid-line groupings of wheel transducers in accordance with diagonal-grouping concepts.

The schematic diagramming in FIG. 6 characterizes a wheel and bogie array like that of FIG. 2, together with dashed and solid linework embracing and identifying those transducers whose outputs are paired for the purposes of this invention. In the wing bogies, solid linework 40 and 41 appears with the left and right-hand diagonal pairings of certain tires and transducers which are in a desired complementary relationship, and dashed linework 42 and 43 appears with the remaining two complementary pairings of tires and transducers of those wing bogies. Similarly, in connection with the body bogies, solid linework 44 and 45 appears with the left and right-hand diagonal pairings of certain tires and transducers which are in a desired complementary relationship, and dashed linework 46 and 47 appears with the remaining two complementary pairings of tires and transducers of the body bogies. Although one could treat each transducer output separately, to obtain related "blown" tire information, this would entail use of much more wiring and comparator circuitry, and related complexities and weight would be highly undesirable, particularly for aircraft installations, wherein weight and bulk are to be avoided whenever possible. If side-by-side or fore-and-aft transducers of one bogie were to be compared as to outputs, the results would not be as reliable as comparisons between diagonally related pairs of transducers, because of such factors as friction in the bogie pivot pin, or unequal loadings resulting from wing flexures. Even comparisons of individual tire loads on complementary bogies presents problems, because of lateral unbalance of the aircraft caused by such factors as unsymmetrical loading, runway slope, and wind effects. By way of distinction, comparisons between outputs from certain diagonally-opposite pairs of transducers on a bogie will essentially eliminate not only pivot-pin friction influences but also those due to lateral unbalances accompanying strut spreads with wing deflections.

Figure 7:
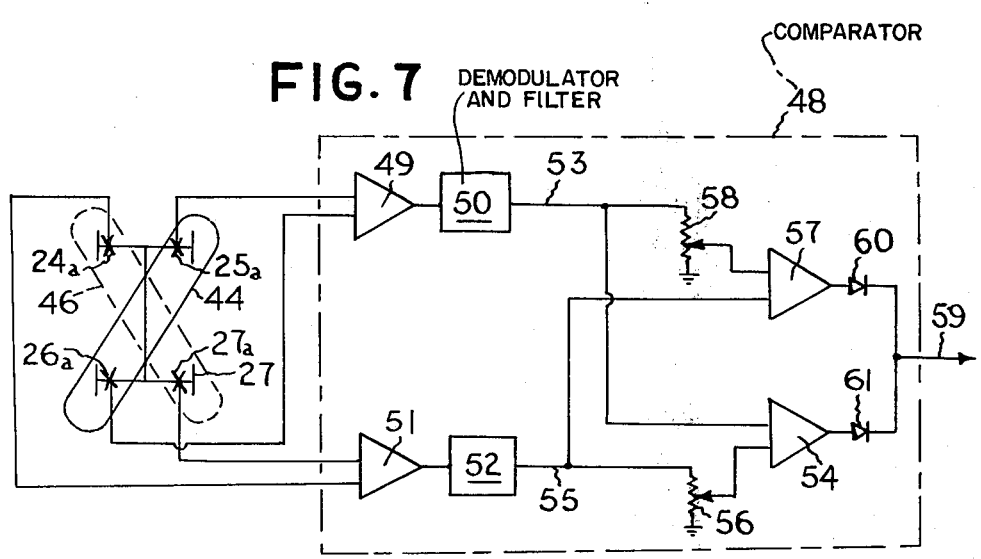
FIG. 7 is a simplified schematic representation of a single bogie associated with an electronic comparator network which detects a "blown" tire condition in any one of the bogie wheels.

A representation of a comparison arrangement which aids in understanding certain of the inventive concepts appears in FIG. 7. There, the outputs of diagonally-opposite transducers 25a and 26a are summed for processing in one channel of a comparator 48, including a suitable amplifier 49 and appropriate collateral demodulator and filter provisions 50. At the same time, outputs from the remaining diagonally opposite transducers 24a and 27a are summed for processing in another channel including amplifier 51 and collateral provisions 52. In turn, the first-channel output appearing in lead 53 is applied to a first differential amplifier 54, together with an input from the second-channel output lead 55 which is derived from a selected tapping of a resistance 56 across which the latter output is impressed. Similarly, the second-channel output appearing in lead 55 is applied to a second differential amplifier 57 together with an input from the first-channel output lead 53 which is derived from a selected tapping of a resistance 58 across which the first-channel output is impressed. The tappings of resistances 56 and 58 are adjusted to establish a "range" or "window" of variations in channel outputs within which the differential amplifiers 54 and 57 will not deliver "alarm" output signals, such that safe levels of tire underinflation will not needlessly produce a warning signal, for example. Uses of tapped signals from the companion channels as references for the last-described purposes is advantageous in that they will fluctuate desirably with those loading conditions which affect all tires in about the same way. If the output from one of differential amplifiers 54 and 57 exceeds that from the other, it will make an appropriate level of "alarm" available in output lead 59, as intended, to characterize occurrence of a "blown" tire. Diodes 60 and 61 block unwanted interferences between the outputs of the differential amplifiers. Considering once again a possible failure as to tire 27, it would be found that transducer 27a would drop in output, as would also the diagonally opposite transducer 24a, while the outputs from both diagonally opposite transducers 25a and 26a would increase. Accordingly, the summed outputs characterized in channel lead 55 would decrease while those characterized in channel lead 53 would increase, the latter representing what may be termed a "self-amplifying" characteristic of the system. Appropriately, the input to differential amplifier 57 via lead drops, while the compared reference from tapped resistance 58 rises; concurrently, the input to differential amplifier 54 via lead 53 increases while the compared reference from tapped resistance 56 rises. Depending upon circuit and differential amplifier characteristics selected by the designer, either amplifier 54 and 57 may be responsible for the desired alarm output signal then appearing in lead 59.

Figure 5:
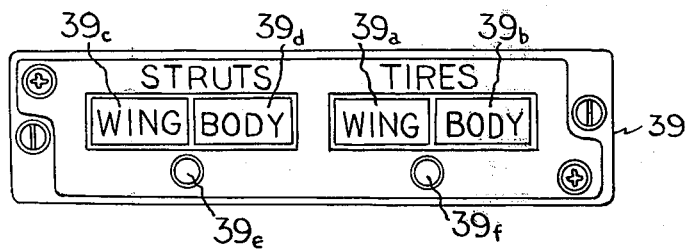
FIG. 5 portrays the front panel of a typical tire/strut indicator used with the improved system.
Figure 8:
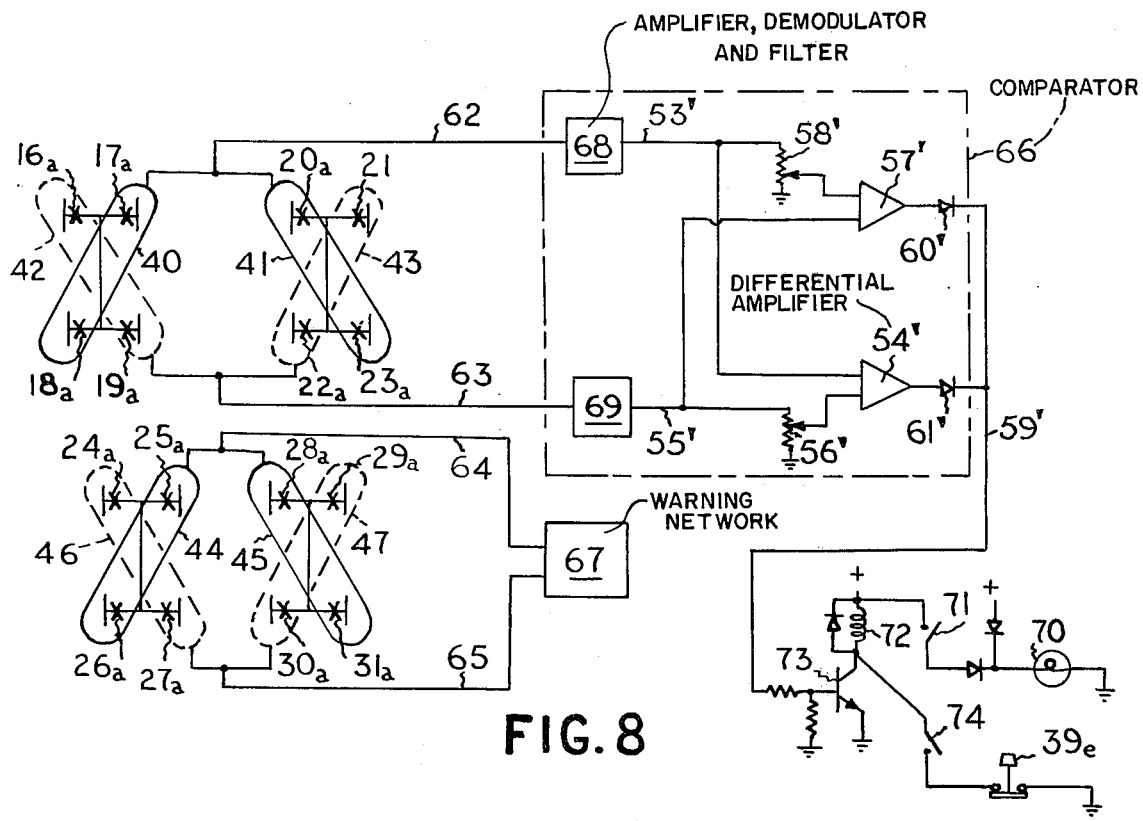
FIG. 8 provides a partly schematic and partly block-diagrammed circuit arrangement for detection and signaling of a "blown" tire in the main undercarriage of an aircraft such as that characterized in FIGS. 2 and 6.

A preferred circuit and transducer-interconnection arrangement for warning of a "blown" tire in either the wing or body bodies is presented in FIG. 8. There, the cables 62 through 65 are symbolically associated with the diagonal-pairing line-work 40 through 47, and it should be understood that each such cable characterizes a two-lead coupling for parallelled outputs from two complementary diagonal pairs of bogie transducers. By way of example, cable 62 conveys to comparator 66 the parallelled outputs from transducers 17a and 18a of the left wing bogie and from the complementary pair of transducers 20a and 23a of the right wing bogie; other cabling is arranged similarly, as shown in FIG. 8, with the body bogie cabling being associated with a second comparator and warning network 67. Considering comparator 66, it will be noted that it is akin to comparator 48 in FIG. 7, except that the amplifiers, demodulators and filters in the two channels served by cables 62 and 63 are represented by single blocks, 68 and 69. Other circuit features are functionally like those described in connection with FIG. 7, and are numbered correspondingly with distinguishing single-prime accents added; the comparator operating characteristics will therefore be understood to be like those of comparator 48 and will thus not be discussed in detail. When a "blown" tire condition is sensed by any one of the transducers 17a, 18a, 20a or 23a of the wing bogies, the signals applied to comparator 66 via cabling 62 decrease while those applied via cabling 63 increase, thereby causing comparator 66 to deliver a related warning-signal output via lead 59'. A similar result obtains when a "blown" tire condition is sensed by any such of transducers 16a, 19a, 21a or 22a. Wing-tire alarm lamp 70, which may be disposed behind warning marking 39a of the panel indicator 39 in FIG. 5, is illuminated upon closure of relay switch 71 when its associated relay winding 72 is energized via transistor 73 which responds to warning-signal output from lead 59'. Once the relay is operated to closure in this way, it "latches" itself closed via its associated switch 74, and the warning light is sustained until reset button 39e is manually operated to break the latching. Resetting may also be achieved automatically, by way of a comparable switching responsive to minimum sensed weight of the craft, for example.

Warning of tire failure among those in the body bogies is achieved in the same fashion, through network 67 to which the body bogie transducers supply their outputs. A suitable warning lamp in network 67 cooperates with warning marker 39b of indicator 39 (FIG. 5), and the associated latched relay arrangement is like that described for the wing-bogie tires, and may be reset by way of the same button 39e.

Figure 9:
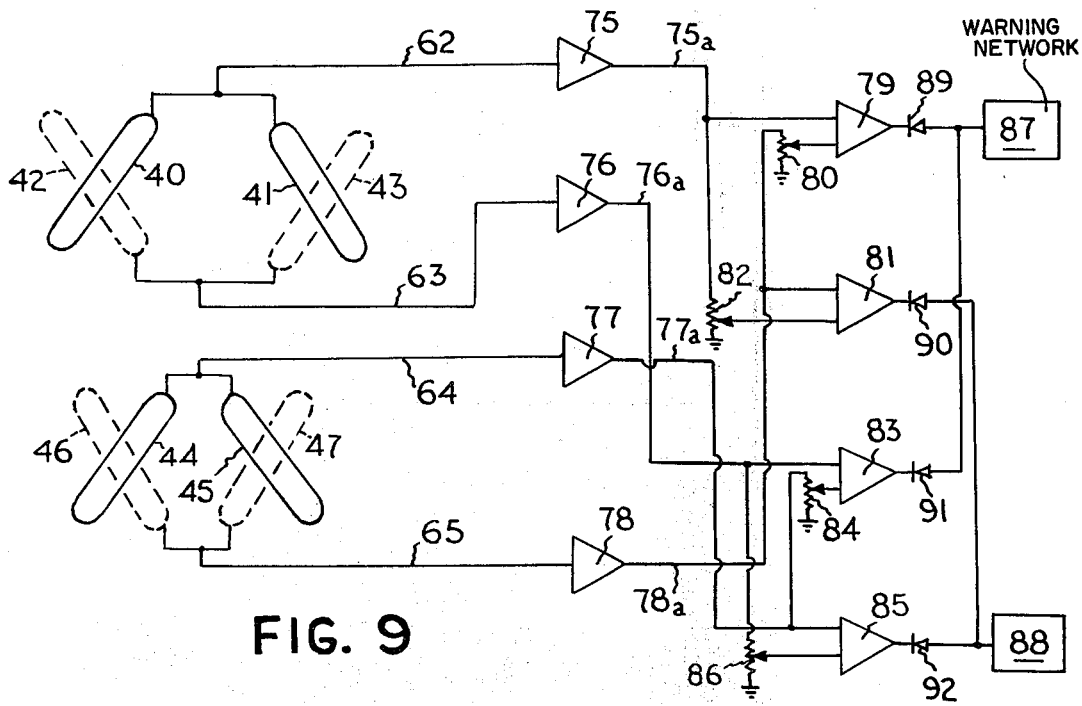
FIG. 9 provides a diagram like that of FIG. 8, for detection and signaling of a depressurized strut condition.

The same diagonal-pairings of transducers which appears in FIG. 8 is also advantageously harmonious with needs of strut-fault indications, and is illustrated schematically in FIG. 9. There, the combined outputs carried by cablings 62–65 are each separately processed by summing amplifiers 75–78, respectively, and summed outputs from the latter are then compared in a unique manner which desirably avoids triggering of any strut alarm due to a "blown" tire. For the latter purposes, the summed wing-transducer outputs in line 75a are are compared with a selected percentage of the summed body-transducer outputs in line 78a, by a differential amplifier 79, the desired percentage being adjusted by tapping from a load resistance 80; and, conversely, the outputs in line 78a are at the same time compared with a selected percentage of the outputs in line 75a, by a differential amplifier 81, in association with tapped load resistance 82. Similarly, the other wing-transducer outputs, in line 76a are compared in differential amplifier 83 with a selected percentage of the summed outputs of the other body transducers appearing in line 77a and tapped from resistance 84. Again, there is a converse arrangement, wherein outputs in line 77a are compared in differential amplifier 85 with a selected percentage of the outputs in line 76a, as tapped from resistance 86. The said tappings automatically provide references which fluctuate advantageously with overall craft load variations, and the percentage selected provide a "window" or range of comparisons allowing for changes in outputs which are not serious enough to represent actual strut failures and which, therefore, should not develop warning indications. If the wing-bogie output in 75a is less than the tapped body-bogie output from 78a, amplifier 79 will attempt to deliver a warning signal to the wing-strut warning unit 87, which, like the related network in FIG. 8, preferably includes a transistor-energized relay coil, a warning lamp for marker 39c (FIG. 5) which is switched on by relay contacts, and latching and reset contacts. Likewise, the same wing-strut warning unit 87 will tend to be actuated by amplifier 83 if the wing-bogie output from 76a is less than the tapped body-bogie output from 77a. Body-strut warning unit 88 is like unit 87, except that its lamp is of course associated with warning marker 39d, and unit 88 will tend to be triggered whenever wing-bogie output from 75a exceeds the tapped body-bogie output from 78a, or whenever the wing-bogie output from 76a exceeds the tapped body-bogie output from 77a. However, it should be noted that the aforementioned tendencies for the warning units 87 and 88 to be actuated will not actually result in warnings unless both diagonal pairs of transducers on any one bogie lowered outputs, this being characteristic of a strut which is faulty and does not allow its bogie to carry its intended share of the overall craft loading. Diodes 89–92 play a related role, because they insure that strut warnings will not result unless both outputs in wing-bogie lines 75a and 76a are lowered, or unless both outputs in body-bogie lines 77a and 78a are lowered. If, instead, there is merely a "blown" tire in one of the wing bogies, only one of the outputs in lines 75a and 76a will decrease, while the other increases, and, accordingly, one of differential amplifiers 79 and 83 will, with the aid of diodes 89 and 91, keep the input to warning unit 87 from reaching the level at which warning can be triggered. The same type of circuit logic is involved in the system components associated with the body bogies, such that a "blown" tire there will not falsely trigger a strut-failure warning.

Those skilled in the art will appreciate that various modifications, substitutions and combinations may be effected within the scope of this invention. By way of example, bogie and strut distributions for aircraft other than that specifically illustrated may also be served by either or both of the tire and strut indication equipments, and the suspensions instrumented for detection of failures may be other than those of aircraft. Although transducers such as those which have been described and referenced are preferred, and although their locations as described are also preferred, other gaging at other locations yielding functionally comparable results may be exploited to advantage. Accordingly, it should be understood that the specific preferred embodiments and practices described herein have been presented by way of disclosure rather than limitation, and that certain departures may be accommodated within the spirit and scope of this invention in its broader aspects and as set forth in the accompanying claims.

What we claim as new and desire to secure by letters patent of the United States is:

1. Apparatus for sensing and signalling faults associated with a suspension structure for vehicles and the like having a plurality of spaced load-carrying supports such as wheels and the like, comprising a plurality of strain-gage transducer means each producing an electrical output characterizing the loading being carried by a different one of said supports, electrical comparator means for producing output signals characterizing differences between two input signals applied thereto, means applying as input signals to said comparator means a first signal related to the first electrical output from at least one of said transducer means and a reference signal related to a selected portion of the second electrical output from at least one other of said transducer means, and fault-signalling means responsive to said output signals from said comparator means, whereby said input signals to said comparator means tend to vary together with changes in the overall loading experienced by said suspensions structure and said differences between said input signals tend to increase upon occurrence of a fault which reduces the load carried by one of said supports and which causes the other of said supports to carry a greater share of the overall loading.

2. Apparatus as set forth in claim 1 wherein said comparator means includes two comparator channels each for producing said output signals, and wherein said input signals are applied to one of said comparator channels, and further including means applying as input signals to the other of said comparator channels said second electrical output and a reference signal related to a selected portion of said first electrical output.

3. Apparatus as set forth in claim 2 wherein said suspension structure includes at least four wheels in a substantially four-cornered array and serving as load-carrying supports for a vehicle, and wherein said transducer means are in stationary relationship with portions of said structure whose elastic deformations characteristize loadings carried by said wheels, sai first electrical output comprising a combination of th electrical outputs from two of said transducers whic i sense said deformations characterizing loadings ca ried by two of said wheels which are substantially diagonally opposite one another in said array, and said second electrical output comprising a combination of the electrical outputs from another two of said transducers which sense said deformations characterizing loadings carried by another two of said wheels which are substantially diagonally opposite one another in said array.

4. Apparatus as set forth in claim 3 wherein said portions of said structure comprise axles on which said wheels are mounted, and wherein each said combination of electrical outputs comprises a summation of electrical outputs from two of said transducers.

5. Apparatus as set forth in claim 4 wherein said suspension structure comprises an aircraft undercarriage, wherein said wheels include pneumatic tires, and wherein said fault-signalling means includes self-latching warning signal means for warning of a "blown" tire condition of any of said tires, said reference signals being adjustable to prevent warning by said fault-signalling means except when effects of said "blown" tire condition upon said electrical outputs exceeds effects which may be encountered otherwise.

6. Apparatus for sensing and signalling faults associated with an aircraft undercarriage structure having struts and at least four pneumatically tired wheels in a four-cornered array and carrying the aircraft loadings, comprising a plurality of strain-gage transducer means each producing an electrical output characterizing the loading being carried by a different one of said wheels, a pair of electrical comparators each producing output signals characterizing differences between two input signals applied thereto, means applying as input signals to one of said comparators a first electrical signal which comprises the summation of electrical outputs from a first pair of said transducer means which characterize the loadings carried by two of said wheels which are substantially diagonally opposite one another in said array, and means applying as reference input signals to said one of said comparator a selected portion of a second electrical signal which comprises the summation of electrical outputs from a second pair of said transducer means which characterize the loadings carried by two other of said wheels which are also substantially diagonally opposite one another in said array, and means applying as input signals to the other of said comparators said second electrical signal and a reference signal comprising a selected portion of said first electrical signal, and fault-signalling means responsive to said output signals from said comparators.

7. Apparatus as set forth in claim 6 wherein said transducer means sense load-induced deformation of axles on which said wheels are mounted, wherein said comparators each include a differential amplifier, and wherein said fault-signalling means includes self-latching relay means for actuating a fault-warning indicator.

8. Apparatus as set forth in claim 7 wherein at least two of said struts are associated with bogies each having at least four of said wheels in a four-cornered array, said struts being disposed at right and left portions laterally in relation to the aircraft, wherein said first electrical signal comprises the summation of electrical outputs from said first pair of said transducers means disposed on one of said bogies and from a like pair of said transducer means disposed in complementary relation on the other of said bogies, and wherein said second electrical signal comprises the summation of electrical outputs from said second pair of said transducer means disposed on one of said bogies and from a like pair of said transducer means disposed in complementary relation on the other of said bogies.

9. Apparatus as set forth in claim 8 wherein two further struts are associated with further bogies each having at least four of said wheels in a four-cornered array, one pair of said struts being forward of the other, and a second pair of electrical comparators each characterizing differences between two input signals applied thereto, means producing a third electrical signal which comprises the summation of electrical outputs from a third pair of said transducer means characterizing the loadings carried by two substantially diagonally opposite wheels on one of said further bogies and from a like pair of said transducer means disposed in complementary relation to the other of said bogies, means producing a fourth electrical signal which comprises the summation of outputs from a fourth pair of said transducer means characterizing the loadings carried by two other of said wheels which are also substantially diagonally opposite on said one of said further bogies and from a like pair of said transducer means disposed in complementary relation on the other of said bogies, means applying said third electrical signal and a selected portion of said fourth electrical signal as input signals to one of said second pair of comparators, and means applying said fourth electrical signal and a selected portion of said third electrical signal as input signals to the other of said second pair of comparators.

10. Apparatus as set forth in claim 9 wherein said fault-signalling means warns of a "blown" tire in the bogies associated with said two of said struts, and further fault-signalling means including self-latching relay means for actuating a "blown" tire indicator which indicates a "blown" tire in the bogies associated with said two further struts, said further fault-signalling means being responsive to output signals from said second pair of comparators.

11. Apparatus as set forth in claim 9 further including first means for comparing said first electrical signal with a selected portion of said fourth, signal, and second means for comparing said second signal with a selected portion of said third signal, and third means for comparing said third signal with a selected portion of said second signal, and fourth means for comparing said fourth signal with a selected portion of said first signal, said comparing means producing output signals characterizing differences between said compared signals, and two further fault-signalling means each for indicating that a strut in a different one of the two sets of struts is not properly supporting said aircraft, one of said further fault-signalling means being responsive only to outputs from said first and second means characterizing that both of said first and second signals are simultaneously less than the selected portions of said fourth and third signals, respectively, and the other of said further fault-signalling means being responsive to outputs from said third and fourth means characterizing that both said fourth and third signals are simultaneously less than the selected portions of said first and second signals, respectively.

* * * * *